United States Patent
Zhou et al.

(10) Patent No.: US 12,381,788 B2
(45) Date of Patent: Aug. 5, 2025

(54) TRAFFIC PREDICTION METHOD AND APPARATUS, AND STORAGE MEDIUM

(71) Applicant: Huawei Technologies Co., Ltd., Shenzhen (CN)

(72) Inventors: Yinsheng Zhou, Beijing (CN); Qian Huang, Beijing (CN); Liyan Xu, Beijing (CN); Junxian Mo, Shenzhen (CN); Yaoli Wang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 18/497,499

(22) Filed: Oct. 30, 2023

(65) Prior Publication Data
US 2024/0064064 A1   Feb. 22, 2024

Related U.S. Application Data

(63) Continuation of application No. PCT/CN2022/088774, filed on Apr. 24, 2022.

(30) Foreign Application Priority Data

Apr. 30, 2021  (CN) .......................... 202110487793.4

(51) Int. Cl.
*H04L 41/147*  (2022.01)
*H04L 41/16*  (2022.01)
*H04L 43/0876*  (2022.01)

(52) U.S. Cl.
CPC ............ *H04L 41/147* (2013.01); *H04L 41/16* (2013.01); *H04L 43/0876* (2013.01)

(58) Field of Classification Search
CPC .... H04L 41/147; H04L 41/16; H04L 43/0876
See application file for complete search history.

(56) References Cited

U.S. PATENT DOCUMENTS 11,489,733 B2 * 11/2022 Soryal .................... G06N 20/00
2009/0222388 A1 *  9/2009 Hua ........................ G06N 5/02
                                                         382/103

(Continued)

FOREIGN PATENT DOCUMENTS

CN   108900346 A   11/2018

OTHER PUBLICATIONS

Saif Ur Rehman et al. "Performance Evaluation of Frequent Subgraph Discovery Techniques", published Aug. 6, 2014, 7 pages. (Year: 2014).*

(Continued)

*Primary Examiner* — G. C. Neurauter, Jr.
(74) *Attorney, Agent, or Firm* — Conley Rose, P.C.

(57) ABSTRACT

A traffic prediction method includes performing traffic autonomous zone division on a to-be-predicted geographic area based on geographic information data of the geographic area and crowd flow data of the geographic area to obtain a plurality of sub-areas; determining, for any sub-area, a crowd flow motif in the sub-area based on geographic information data of the sub-area and crowd flow data of the sub-area, where the crowd flow motif indicates a multi-point crowd motion pattern in the sub-area; determining a crowd flow feature of the sub-area based on the crowd flow motif; and predicting data traffic of the sub-area based on the crowd flow feature of the sub-area to obtain a data traffic prediction result of the sub-area.

20 Claims, 6 Drawing Sheets

(56) References Cited

U.S. PATENT DOCUMENTS

| | | | | |
|---|---|---|---|---|
| 2010/0015926 | A1* | 1/2010 | Luff | H04L 41/0604 |
| | | | | 455/67.13 |
| 2016/0127943 | A1* | 5/2016 | Shaw | H04W 28/0231 |
| | | | | 370/230 |
| 2018/0032587 | A1* | 2/2018 | Abdelhamid | G06F 16/9024 |
| 2018/0124566 | A1* | 5/2018 | Colonna | H04W 4/029 |
| 2018/0359648 | A1* | 12/2018 | Savalle | H04W 36/32 |
| 2020/0186473 | A1* | 6/2020 | Serrano Garcia | H04L 47/127 |
| 2021/0409972 | A1* | 12/2021 | Byrne | G01S 5/0027 |
| 2022/0110021 | A1* | 4/2022 | Livne | H04W 28/0231 |

OTHER PUBLICATIONS

Shuo Yu et al. "Motifs in Big Networks: Method and Applications", Dec. 2019, 17 pages. (Year: 2019).*

Chrysanthi Kosyfaki et al. "Flow Motifs in Interaction Networks", Oct. 2018, 12 pages. (Year: 2018).*

Tu, Y., et al., "Deep traffic congestion prediction model based on road segment grouping", Springer, Applied Intelligence, Apr. 7, 2021, 23 pages.

Liu, L., et al., "Dynamic Spatial-Temporal Representation Learning for Traffic Flow Prediction", arXiv: 1909.02902v3 [cs. LG], Intelligent Transactions on Intelligent Transportation Systems, Apr. 26, 2020, 15 pages.

* cited by examiner

TRAFFIC PREDICTION METHOD AND APPARATUS, AND STORAGE MEDIUM

CROSS-REFERENCE TO RELATED APPLICATIONS

This is a continuation of International Patent Application No. PCT/CN2022/088774 filed on Apr. 24, 2022, which claims priority to Chinese Patent Application No. 202110487793.4 filed on Apr. 30, 2021, which are incorporated by reference.

TECHNICAL FIELD

This disclosure relates to the field of computer technologies, and in particular, to a traffic prediction method and apparatus, and a storage medium.

BACKGROUND

Network data traffic prediction is of great significance in telecommunication network control and management. Long-time prediction of network data traffic is helpful to network traffic planning to better cope with possible network problems. Short-time prediction of network data traffic facilitates real-time dynamic planning of various network resources, for example, bandwidth allocation, load balancing, and base station energy saving.

Currently, data traffic prediction of a telecommunication network usually depends on traffic statistics data of the network. For example, data traffic prediction is performed according to a time sequence rule of traffic data of a wireless cell and by mining a relationship between history and future, that is, future traffic data is predicted based on a time sequence curve of historical traffic data. However, this method usually requires accumulation of high-quality historical traffic data. Prediction cannot be performed without historical traffic data.

SUMMARY

In view of this, a traffic prediction method and apparatus, and a storage medium are provided.

According to a first aspect, an embodiment of this disclosure provides a traffic prediction method. The method includes performing traffic autonomous zone division on a to-be-predicted geographic area based on geographic information data of the geographic area and crowd flow data of the geographic area to obtain a plurality of sub-areas; determining, for any sub-area, a crowd flow motif in the sub-area based on geographic information data of the sub-area and crowd flow data of the sub-area, where the crowd flow motif indicates a multi-point crowd motion pattern in the sub-area; determining a crowd flow feature of the sub-area based on the crowd flow motif, where the crowd flow feature indicates an occurrence frequency of the crowd flow motif in the sub-area; and predicting data traffic of the sub-area based on the crowd flow feature of the sub-area to obtain a data traffic prediction result of the sub-area.

According to this embodiment of this disclosure, the traffic autonomous zone division may be performed on the to-be-predicted geographic area based on the geographic information data of the geographic area and the crowd flow data of the geographic area to obtain the plurality of sub-areas. For any sub-area, the crowd flow motif in the sub-area is determined based on the geographic information data of the sub-area and the crowd flow data of the sub-area. The crowd flow feature of the sub-area is determined based on the crowd flow motif. The data traffic of the sub-area is further predicted based on the crowd flow feature of the sub-area to obtain the data traffic prediction result of the sub-area. In this way, the data traffic of the sub-area is predicted by constructing the crowd flow motif based on the sub-area and using the crowd flow feature determined by the crowd flow motif. Therefore, a geographic area without historical traffic data can be predicted to enable data traffic prediction to be independent of historical traffic data of the to-be-predicted geographic area, and accuracy of the data traffic prediction can be improved.

According to the first aspect, in a first possible implementation of the traffic prediction method, the data traffic prediction result includes a traffic prediction curve. The predicting data traffic of the sub-area based on the crowd flow feature of the sub-area to obtain a data traffic prediction result of the sub-area includes processing the crowd flow feature by using a pre-trained traffic prediction model to obtain a coefficient of the traffic prediction curve of the sub-area, where the traffic prediction curve is a linear combination of traffic category curves corresponding to the traffic prediction model, and the coefficient of the traffic prediction curve indicates a weight of each traffic category curve in the traffic prediction curve; and determining the traffic prediction curve of the sub-area based on the coefficient of the traffic prediction curve of the sub-area and the traffic category curve corresponding to the traffic prediction model.

In this embodiment, the crowd flow feature may be processed by using the pre-trained traffic prediction model (namely, a trained quantity traffic model) to obtain the coefficient of the traffic prediction curve of the sub-area. In addition, the data traffic prediction result (namely, the traffic prediction curve) of the sub-area is determined based on the coefficient of the traffic prediction curve of the sub-area and the traffic category curve corresponding to the traffic prediction model. In this way, the data traffic prediction may be performed by using the traffic prediction model that uses the crowd flow feature as an input to enable data traffic prediction to be independent of the historical traffic data of the to-be-predicted geographic area. In addition, the data traffic prediction result of the sub-area is determined based on the coefficient of the traffic prediction curve of the sub-area determined by the traffic prediction model and the traffic category curve corresponding to the traffic prediction model to improve accuracy of the data traffic prediction.

According to the first aspect, in a second possible implementation of the traffic prediction method, the determining a crowd flow motif in the sub-area based on geographic information data of the sub-area and crowd flow data of the sub-area includes determining location information of a key landmark in the sub-area based on the geographic information data of the sub-area; determining a crowd flow feature map of the sub-area based on the crowd flow data of the sub-area and the location information of the key landmark, where the crowd flow feature map is a directed graph including a plurality of nodes and a connection line between the nodes, the node indicates the key landmark, and the connection line indicates a crowd flow direction between the nodes; and extracting the crowd flow motif in the sub-area from the crowd flow feature map.

In this embodiment, the location information of the key landmark in the sub-area is determined, and the crowd flow feature map of the sub-area is determined based on the crowd flow data of the sub-area and the location information of the key landmark to extract the crowd flow motif from the crowd flow feature map. This not only improves accuracy and extraction efficiency of the crowd flow motif, but also enables each node of the crowd flow motif to have spatial semantics to improve interpretability of the crowd flow motif.

According to the first possible implementation of the first aspect, in a third possible implementation of the traffic prediction method, the method further includes training the traffic prediction model based on a preset sample set. The sample set includes geographic information data of a plurality of sample areas, crowd flow data of the plurality of sample areas, and historical traffic data of the plurality of sample areas.

In this embodiment, the traffic prediction model is trained by using the preset sample set to obtain a trained traffic prediction model. This can improve accuracy of the traffic prediction model, and improve accuracy of the data traffic prediction.

According to the third possible implementation of the first aspect, in a fourth possible implementation of the traffic prediction method, the training the traffic prediction model based on a preset sample set includes determining a crowd flow feature of each sample area based on the geographic information data of each sample area and the crowd flow data of each sample area in the sample set; determining traffic category curves based on the historical traffic data of the plurality of sample areas; separately determining a first traffic curve of each sample area based on the traffic category curve, where the first traffic curve is a linear combination of the traffic category curves; and using the crowd flow feature of each sample area as an input, and using a coefficient of the first traffic curve of each sample area as an output to train the traffic prediction model.

In this embodiment, the crowd flow feature of each sample area in the sample set and the first traffic curve of each sample area in the sample set are determined, the crowd flow feature of each sample area is used as the input, and the coefficient of the first traffic curve of each sample area is used as the output to train the traffic prediction model. Therefore, accuracy of the traffic prediction model can be improved to enable the traffic prediction model to be independent of the historical traffic data, and transferability of the traffic prediction model can be improved. In addition, the crowd flow feature is restricted within the sample area to improve interpretability of the traffic prediction model.

According to a fourth possible implementation of the first aspect, in a fifth possible implementation of the traffic prediction method, the determining traffic category curves based on the historical traffic data of the plurality of sample areas includes determining a second traffic curve of each sample area based on the historical traffic data of each sample area; and performing clustering on second traffic curves of the plurality of sample areas to obtain the traffic category curves.

In this embodiment, the second traffic curve of each sample area is determined based on the historical traffic data of each sample area, and the second traffic curves are clustered to obtain the traffic category curves. This is simple, fast, and accurate, thereby improving processing efficiency and accuracy.

According to the first aspect or any one of the first possible implementation to the fifth possible implementation of the first aspect, in a sixth possible implementation of the traffic prediction method, the geographic information data includes at least one of a road network, a point of interest, an area of interest, a building type, or a social management grid of the geographic area, and the crowd flow data includes at least one of online crowd flow big data, crowd track data in minimization drive test data, or base station handover data related to crowd flow.

According to the first aspect or one or more of a plurality of possible implementations of the first aspect, in a seventh possible implementation of the traffic prediction method, the method is applied to data traffic prediction of a telecommunication network, and the data traffic prediction result includes a data traffic prediction result of the telecommunication network.

In this embodiment, the traffic prediction method is applied to the data traffic prediction of the telecommunication network such that the data traffic prediction may be performed on the geographic area without the historical traffic data or a geographic area with poor-quality historical traffic data to obtain the data traffic prediction result. In this way, the data traffic prediction result may be used as a reference for a telecommunication operator to make decisions such as network planning, bandwidth allocation, load balancing, and base station energy saving.

According to a second aspect, an embodiment of this disclosure provides a traffic prediction apparatus. The apparatus includes: a sub-area division module, configured to perform traffic autonomous zone division on a to-be-predicted geographic area based on geographic information data of the geographic area and crowd flow data of the geographic area to obtain a plurality of sub-areas; a crowd flow motif determining module, configured to determine, for any sub-area, a crowd flow motif in the sub-area based on geographic information data of the sub-area and crowd flow data of the sub-area, where the crowd flow motif indicates a multi-point crowd motion pattern in the sub-area; a crowd flow feature determining module, configured to determine a crowd flow feature of the sub-area based on the crowd flow motif, where the crowd flow feature indicates an occurrence frequency of the crowd flow motif in the sub-area; and a traffic prediction module, configured to predict data traffic of the sub-area based on the crowd flow feature of the sub-area to obtain a data traffic prediction result of the sub-area.

According to this embodiment of this disclosure, the traffic autonomous zone division may be performed on the to-be-predicted geographic area based on the geographic information data of the geographic area and the crowd flow data of the geographic area to obtain the plurality of sub-areas. For any sub-area, the crowd flow motif in the sub-area is determined based on the geographic information data of the sub-area and the crowd flow data of the sub-area. The crowd flow feature of the sub-area is determined based on the crowd flow motif. The data traffic of the sub-area is further predicted based on the crowd flow feature of the sub-area to obtain the data traffic prediction result of the sub-area. In this way, the data traffic of the sub-area is predicted by constructing the crowd flow motif based on the sub-area and using the crowd flow feature determined by the crowd flow motif. Therefore, a geographic area without historical traffic data can be predicted to enable data traffic prediction to be independent of historical traffic data of the to-be-predicted geographic area, and accuracy of the data traffic prediction can be improved.

According to the second aspect, in a first possible implementation of the traffic prediction apparatus, the data traffic prediction result includes a traffic prediction curve. The traffic prediction module is configured to process the crowd flow feature by using a pre-trained traffic prediction model to obtain a coefficient of the traffic prediction curve of the sub-area, where the traffic prediction curve is a linear combination of traffic category curves corresponding to the traffic prediction model, and the coefficient of the traffic prediction curve indicates a weight of each traffic category curve in the traffic prediction curve; and determine the traffic prediction curve of the sub-area based on the coefficient of the traffic prediction curve of the sub-area and the traffic category curve corresponding to the traffic prediction model.

In this embodiment, the crowd flow feature may be processed by using the pre-trained traffic prediction model (namely, a trained quantity traffic model) to obtain the coefficient of the traffic prediction curve of the sub-area. In addition, the data traffic prediction result (namely, the traffic prediction curve) of the sub-area is determined based on the coefficient of the traffic prediction curve of the sub-area and the traffic category curve corresponding to the traffic prediction model. In this way, the data traffic prediction may be performed by using the traffic prediction model that uses the crowd flow feature as an input to enable traffic prediction to be independent of the historical traffic data of the to-be-predicted geographic area. In addition, the data traffic prediction result of the sub-area is determined based on the coefficient of the traffic prediction curve of the sub-area determined by the traffic prediction model and the traffic category curve corresponding to the traffic prediction model to improve accuracy of the data traffic prediction.

According to the second aspect, in a second possible implementation of the traffic prediction apparatus, the crowd flow motif determining module is configured to determine location information of a key landmark in the sub-area based on the geographic information data of the sub-area; determine a crowd flow feature map of the sub-area based on the crowd flow data of the sub-area and the location information of the key landmark, where the crowd flow feature map is a directed graph including a plurality of nodes and a connection line between the nodes, the node indicates the key landmark, and the connection line indicates a crowd flow direction between the nodes; and extract the crowd flow motif in the sub-area from the crowd flow feature map.

In this embodiment, the location information of the key landmark in the sub-area is determined, and the crowd flow feature map of the sub-area is determined based on the crowd flow data of the sub-area and the location information of the key landmark to extract the crowd flow motif from the crowd flow feature map. This not only improves accuracy and extraction efficiency of the crowd flow motif, but also enables each node of the crowd flow motif to have spatial semantics to improve interpretability of the crowd flow motif.

According to the first possible implementation of the second aspect, in a third possible implementation of the traffic prediction apparatus, the apparatus further includes a training module configured to train the traffic prediction model based on a preset sample set. The sample set includes geographic information data of a plurality of sample areas, crowd flow data of the plurality of sample areas, and historical traffic data of the plurality of sample areas.

In this embodiment, the traffic prediction model is trained by using the preset sample set to obtain a trained traffic prediction model. This can improve accuracy of the traffic prediction model, and improve accuracy of the data traffic prediction.

According to the third possible implementation of the second aspect, in a fourth possible implementation of the traffic prediction apparatus, the training module is configured to determine a crowd flow feature of each sample area based on the geographic information data of each sample area and the crowd flow data of each sample area in the sample set; determine traffic category curves based on the historical traffic data of the plurality of sample areas; separately determine a first traffic curve of each sample area based on the traffic category curve, where the first traffic curve is a linear combination of the traffic category curves; and use the crowd flow feature of each sample area as an input, and use a coefficient of the first traffic curve of each sample area as an output to train the traffic prediction model.

In this embodiment, the crowd flow feature of each sample area in the sample set and the first traffic curve of each sample area in the sample set are determined, the crowd flow feature of each sample area is used as the input, and the coefficient of the first traffic curve of each sample area is used as the output to train the traffic prediction model. Therefore, accuracy of the traffic prediction model can be improved to enable the traffic prediction model to be independent of the historical traffic data, and transferability of the traffic prediction model can be improved. In addition, the crowd flow feature is restricted within the sample area to improve interpretability of the traffic prediction model.

According to the fourth possible implementation of the second aspect, in a fifth possible implementation of the traffic prediction apparatus, the determining traffic category curves based on the historical traffic data of the plurality of sample areas includes determining a second traffic curve of each sample area based on the historical traffic data of each sample area; and performing clustering on second traffic curves of the plurality of sample areas to obtain the traffic category curves.

In this embodiment, the second traffic curve of each sample area is determined based on the historical traffic data of each sample area, and the second traffic curves are clustered to obtain the traffic category curves. This is simple, fast, and accurate, thereby improving processing efficiency and accuracy.

According to the second aspect or any one of the first possible implementation to the fifth possible implementation of the second aspect, in a sixth possible implementation of the traffic prediction apparatus, the geographic information data includes at least one of a map, a road network, a point of interest, an area of interest, a building type, or a social management grid of the geographic area, and the crowd flow data includes at least one of online crowd flow big data, crowd track data in minimization drive test data, or base station handover data related to crowd flow.

According to the second aspect or one or more of a plurality of possible implementations of the second aspect, in a seventh possible implementation of the traffic prediction apparatus, the apparatus is applied to data traffic prediction of a telecommunication network, and the data traffic prediction result includes a data traffic prediction result of the telecommunication network.

In this embodiment, the traffic prediction apparatus is applied to the data traffic prediction of the telecommunication network such that the data traffic prediction may be performed on the geographic area without the historical traffic data or a geographic area with poor-quality historical traffic data to obtain the data traffic prediction result. In this way, the data traffic prediction result may be used as a reference for a telecommunication operator to make decisions such as network planning, bandwidth allocation, load balancing, and base station energy saving.

According to a third aspect, an embodiment of this disclosure provides a traffic prediction apparatus including a processor; and a memory configured to store instructions that can be executed by the processor. When the processor is configured to execute the instructions, the traffic prediction method in one or more of the first aspect or the plurality of possible implementations of the first aspect is implemented.

According to this embodiment of this disclosure, the traffic autonomous zone division may be performed on the to-be-predicted geographic area based on the geographic information data of the geographic area and the crowd flow data of the geographic area to obtain the plurality of sub-areas. For any sub-area, the crowd flow motif in the sub-area is determined based on the geographic information data of the sub-area and the crowd flow data of the sub-area. The crowd flow feature of the sub-area is determined based on the crowd flow motif. The data traffic of the sub-area is further predicted based on the crowd flow feature of the sub-area to obtain the data traffic prediction result of the sub-area. In this way, the data traffic of the sub-area is predicted by constructing the crowd flow motif based on the sub-area and using the crowd flow feature determined by the crowd flow motif. Therefore, a geographic area without historical traffic data can be predicted to enable data traffic prediction to be independent of historical traffic data of the to-be-predicted geographic area, and accuracy of the data traffic prediction can be improved.

According to a fourth aspect, an embodiment of this disclosure further provides a non-volatile computer-readable storage medium, storing computer program instructions. When the computer program instructions are executed by a processor, the traffic prediction method in one or more of the first aspect or the plurality of possible implementations of the first aspect is implemented.

According to this embodiment of this disclosure, the traffic autonomous zone division may be performed on the to-be-predicted geographic area based on the geographic information data of the geographic area and the crowd flow data of the geographic area to obtain the plurality of sub-areas. For any sub-area, the crowd flow motif in the sub-area is determined based on the geographic information data of the sub-area and the crowd flow data of the sub-area. The crowd flow feature of the sub-area is determined based on the crowd flow motif. The data traffic of the sub-area is further predicted based on the crowd flow feature of the sub-area to obtain the data traffic prediction result of the sub-area. In this way, the data traffic of the sub-area is predicted by constructing the crowd flow motif based on the sub-area and using the crowd flow feature determined by the crowd flow motif. Therefore, a geographic area without historical traffic data can be predicted to enable data traffic prediction to be independent of historical traffic data of the to-be-predicted geographic area, and accuracy of the data traffic prediction can be improved.

According to a fifth aspect, an embodiment of this disclosure provides a computer program product. The computer program product includes computer-readable code or a non-volatile computer-readable storage medium carrying computer-readable code. When the computer-readable code is run in an electronic device, a processor in the electronic device performs the traffic prediction method in one or more of the first aspect or the plurality of possible implementations of the first aspect is implemented.

According to this embodiment of this disclosure, the traffic autonomous zone division may be performed on the to-be-predicted geographic area based on the geographic information data of the geographic area and the crowd flow data of the geographic area to obtain the plurality of sub-areas. For any sub-area, the crowd flow motif in the sub-area is determined based on the geographic information data of the sub-area and the crowd flow data of the sub-area. The crowd flow feature of the sub-area is determined based on the crowd flow motif. The data traffic of the sub-area is further predicted based on the crowd flow feature of the sub-area to obtain the data traffic prediction result of the sub-area. In this way, the data traffic of the sub-area is predicted by constructing the crowd flow motif based on the sub-area and using the crowd flow feature determined by the crowd flow motif. Therefore, a geographic area without historical traffic data can be predicted to enable data traffic prediction to be independent of historical traffic data of the to-be-predicted geographic area, and accuracy of the data traffic prediction can be improved.

These aspects and another aspect of this disclosure are clearer and more comprehensible in descriptions of the following (a plurality of) embodiments.

BRIEF DESCRIPTION OF DRAWINGS

Accompanying drawings included in this specification and constituting a part of this specification and this specification jointly show example embodiments, features, and aspects of this disclosure, and are intended to explain principles of this disclosure.

DESCRIPTION OF EMBODIMENTS

Figure 1:
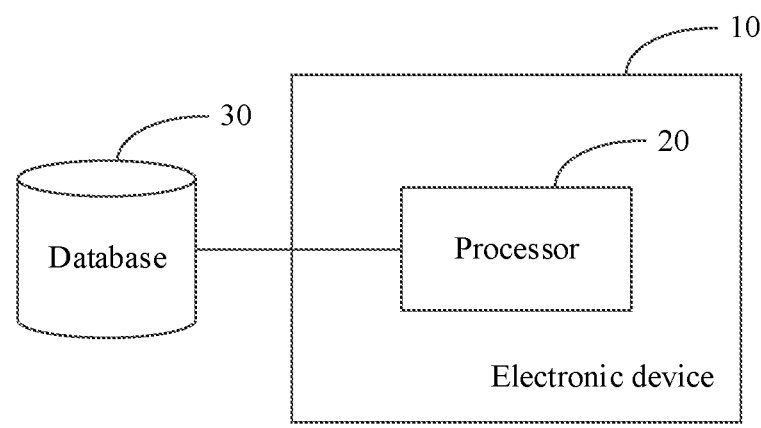
FIG. 1 is a schematic diagram of an application scenario of a traffic prediction method according to an embodiment of this disclosure.

The following describes various example embodiments, features, and aspects of this disclosure in detail with reference to the accompanying drawings. Identical reference numerals in the accompanying drawings indicate elements that have same or similar functions. Although various aspects of embodiments are illustrated in the accompanying drawing, the accompanying drawings are not necessarily drawn in proportion unless otherwise specified.

A specific term "example" herein means "used as an example, embodiment or illustration". Any embodiment described as "example" is not necessarily explained as being preferred or better than other embodiments.

In addition, to better describe this disclosure, numerous specific details are given in the following specific implementations. A person skilled in the art should understand that this disclosure can also be implemented without some specific details. In some examples, methods, means, elements, and circuits that are well-known to a person skilled in the art are not described in detail, so that a subject matter of this disclosure is highlighted.

As 5th generation (5G) mobile communication is deployed on a large scale, investment of a telecommunication operator is further increased. Pressure from an increase of capital expenditure (CAPEX) and an increase of operating expense (OPEX) continues. During network investment for 5G construction and expansion of 4th generation (4G) mobile communication, the telecommunication operator needs to accurately predict network data traffic growth (for example, annual growth of network data traffic), identify data traffic hotspots and high-value areas, and properly plan a network for precise investment to effectively improve average revenue per user (ARPU).

Currently, common methods for network data traffic prediction include a curve-fitting method, a market share method, a conventional time sequence prediction method, a baseline analogy method, and a deep learning-based method. The curve-fitting method is used to fit historical traffic data, and select a curve with a highest fitting degree to extrapolate a trend. Although a model is simple, it is difficult to match a long-term trend, and prediction accuracy is low. The market share method is used to calculate a trend based on a current situation of a terminal, consumer preference, and per capita traffic, and depends on user data information of an operator. However, sensitive client information is difficult to obtain. The conventional time sequence prediction method includes an autoregressive integrated moving average model (ARIMA), linear regression, a Bayesian model, and the like. The conventional time sequence prediction method uses data with small features and has low computing efficiency, which cannot meet prediction requirements of the big data era. Although the baseline analogy method can be used to predict a blank network without historical traffic data, much basic information needs to be collected, and the baseline analogy method depends on subjective experience. Consequently, accuracy is poor.

However, a method based on deep learning, for example, a method based on a long short-term memory (LSTM) network or a method based on a sequence to sequence (seq2seq) model, depends on historical traffic data, has a high requirement on the historical traffic data, has difficulty in transferring (valid only for an area with historical traffic data), has low accuracy of long-time time sequence prediction, and the like.

To resolve the foregoing technical problems, this disclosure provides a traffic prediction method. The traffic prediction method in this embodiment of this disclosure may be used to perform traffic autonomous zone division on a to-be-predicted geographic area based on geographic information data of the geographic area and crowd flow data of the geographic area to obtain a plurality of sub-areas; determine, for any sub-area, a crowd flow motif (which indicates a multi-point crowd motion pattern in the sub-area) of the sub-area based on geographic information data of the sub-area and crowd flow data of the sub-area; determine a crowd flow feature of the sub-area; and predict data traffic of the sub-area based on the crowd flow feature of the sub-area to obtain a data traffic prediction result of the sub-area. The traffic prediction method in this embodiment of this disclosure may be used to construct the crowd flow motif based on the sub-area, and use the crowd flow feature determined by the crowd flow motif to predict the data traffic of the sub-area. Therefore, a geographic area without historical traffic data can be predicted to enable data traffic prediction to be independent of historical traffic data of the to-be-predicted geographic area, and accuracy of the data traffic prediction can be improved.

The traffic prediction method in this embodiment of this disclosure may be applied to an electronic device. The electronic device may be, for example, a server, a desktop computer, a mobile device, or any other type of computing device that includes a processor. A specific type of the electronic device is not limited in this disclosure. The electronic device may include a processor, and the processor may be configured to perform the traffic prediction method.

The processor may include one or more processing units. For example, the processor may include a central processing unit (CPU), an application processor (AP), a modem processor, a graphics processing unit (GPU), an image signal processor (ISP), a controller, a video codec, a digital signal processor (DSP), a baseband processor, and/or a neural-network processing unit (NPU), and the like. Different processing units may be separate devices, or may be integrated in one or more processors.

FIG. 1 is a schematic diagram of an application scenario of a traffic prediction method according to an embodiment of this disclosure. As shown in FIG. 1, an electronic device 10 includes a processor 20. The processor 20 is configured to perform the traffic prediction method. A database 30 connected to the processor 20 is deployed on another device other than the electronic device, and is configured to store geographic information data and crowd flow data. The processor 20 may read geographic information data and crowd flow data of a to-be-predicted geographic area from the database 30, and predict data traffic of the geographic area based on the read geographic information data and crowd flow data. The database 30 may be one database, or may be a plurality of databases of a same type or different types. This is not limited in this disclosure.

Figure 2:
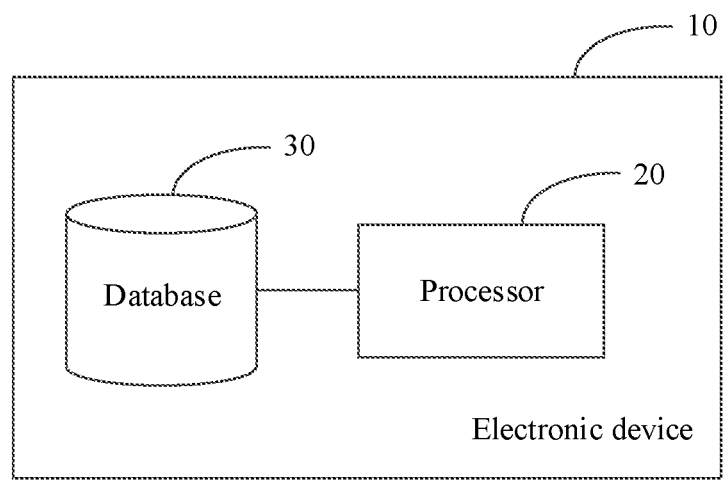
FIG. 2 is a schematic diagram of an application scenario of a traffic prediction method according to an embodiment of this disclosure.

FIG. 2 is a schematic diagram of an application scenario of a traffic prediction method according to an embodiment of this disclosure. As shown in FIG. 2, the electronic device 10 includes the processor 20 and the database 30. The processor 20 is configured to perform the traffic prediction method. The database 30 is configured to store geographic information data and crowd flow data. The processor 20 may read geographic information data and crowd flow data of a to-be-predicted geographic area from the database 30, and predict data traffic of the geographic area based on the read geographic information data and crowd flow data.

In a possible implementation, when there is a plurality of databases, some databases may be further deployed on the electronic device, and other databases may be deployed on another device other than the electronic device. A person skilled in the art may set deployment of the database based on an actual situation. This is not limited in this disclosure.

In a possible implementation, the traffic prediction method may be applied to data traffic prediction of a telecommunication network. An obtained data traffic prediction result may be used as a reference for a telecommunication operator to make decisions such as network planning, bandwidth allocation, load balancing, and base station energy saving. The traffic prediction method may be further applied to another scenario, for example, advertisement placement and market evaluation, in which data traffic prediction needs to be performed. It should be noted that a specific application scenario of the traffic prediction method is not limited in this disclosure.

Figure 3:
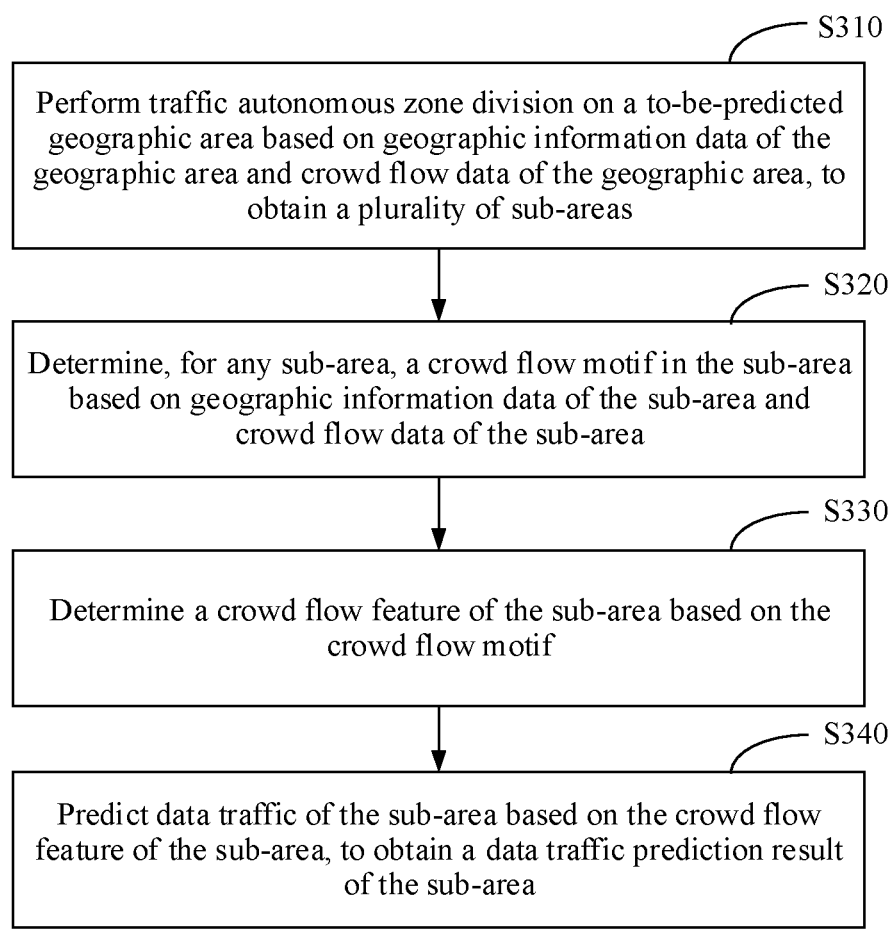
FIG. 3 is a flowchart of a traffic prediction method according to an embodiment of this disclosure.

FIG. 3 is a flowchart of a traffic prediction method according to an embodiment of this disclosure. As shown in FIG. 3, the traffic prediction method includes the following steps.

Step S310: Perform traffic autonomous zone division on a to-be-predicted geographic area based on geographic information data of the geographic area and crowd flow data of the geographic area to obtain a plurality of sub-areas.

The to-be-predicted geographic area may be a geographic area without historical traffic data or may be a geographic area with historical traffic data. This is not limited in this disclosure. The geographic area may be an administrative area such as a province, a city, a district, or a county, or may be a geographic area configured based on an actual requirement (for example, a 5G or 4G network deployment requirement). A specific type and size of the geographic area are not limited in this disclosure.

The geographic information data may include at least one of a map, a road network, a point of interest (POI), an area of interest (AOI), a building type, or a social management grid of the to-be-predicted geographic area. Optionally, the geographic information data may further include other spatial semantic data such as a land use type and location semantics. The geographic information data may be obtained from a preset geographic information system (GIS) database, or may be obtained in another manner. This is not limited in this disclosure.

The crowd flow data may include at least one of online crowd flow big data (namely, coarse-grained data), crowd track data in minimization of drive tests (MDT) data, or base station handover (HO) data related to crowd flow. The crowd track data in the minimization of drive tests data and the base station handover data related to the crowd flow may be considered as fine-grained data. The crowd flow data may be obtained from a base station, a terminal used for minimization of drive tests, or the like, or may be obtained from a large data center, a preset crowd flow track database, or the like. This disclosure does not limit a source of the crowd flow data.

After the geographic information data of the to-be-predicted geographic area and the crowd flow data of the to-be-predicted geographic area are obtained, traffic autonomous zone division may be performed on the to-be-predicted geographic area based on the geographic information data of the geographic area and the crowd flow data of the geographic area to obtain the plurality of sub-areas. Traffic autonomous zone (TAZ) division is a spatial division method based on a road network and a POI in the to-be-predicted geographic area, and interaction strength (which may be determined based on crowd flow data) between spatial places in the geographic area. The traffic autonomous zone division is performed on the to-be-predicted geographic area to obtain the plurality of sub-areas such that a crowd flow rule within each sub-area is highly consistent. In this way, the sub-area can better correspond to a same type of crowd to implement more reasonable functional areas.

In a possible implementation, traffic autonomous zone TAZ division may be alternatively performed on the to-be-predicted geographic area with reference to a network community discovery algorithm to obtain the plurality of sub-areas. In this way, there is a large amount of crowd flow within the sub-area, and there is a small amount of crowd flow between the sub-areas.

In a possible implementation, for any sub-area, a theme of the sub-area may be alternatively determined based on data such as a land use type and location semantics in geographic information data of the sub-area. For example, the theme of the sub-area, for example, a school, a residential area, or a hospital, may be generated by using a theme generation model based on the data such as the land use type and the location semantics in the geographic information data of the sub-area. Comprehensibility and interpretability of the sub-area may be improved by defining the theme for the sub-area.

Step S320: Determine, for any sub-area, a crowd flow motif in the sub-area based on the geographic information data of the sub-area and the crowd flow data of the sub-area.

A motif may be defined as a homogeneous subgraph that appears repeatedly in a network. Occurrence frequency of the motif in a real network is much higher than occurrence frequency of the motif in a random network with a same quantity of nodes and connection lines. The motif may locally describe a specific pattern of interconnection of a given network, and form a complex network with different global structures from bottom to top. The motif may be referred to as a "primitive" of the real network. In other words, the motif describes an adaptability pattern of interaction in the real network from the microcosmic point of view, and forms a global network from bottom to top.

In this embodiment, the crowd flow motif in the sub-area may indicate a multi-point crowd motion pattern in the sub-area, and may be determined based on the geographic information data of the sub-area and the crowd flow data of the sub-area. For example, for any sub-area, the crowd flow motif in the sub-area may be extracted based on the geographic information data of the sub-area and the crowd flow data of the sub-area by using a frequent subgraph mining algorithm, for example, fast frequent subgraph mining (FFSM).

The crowd flow motif is combined with the sub-area to enable spatial semantic information of each node of the crowd flow motif to be clear. For example, each node is an area of a point of interest that can be explained by the land use type, for example, a subway station, a city library, and a people's square. In this way, interpretability of the crowd flow motif can be improved.

In a possible implementation, step S320 may include determining location information of a key landmark in the sub-area based on the geographic information data of the sub-area; determining a crowd flow feature map of the sub-area based on the crowd flow data of the sub-area and the location information of the key landmark, where the crowd flow feature map is a directed graph including a plurality of nodes and a connection line between the nodes, the node indicates the key landmark, and the connection line indicates a crowd flow direction between the nodes; and extracting the crowd flow motif in the sub-area from the crowd flow feature map.

For any sub-area, the location information of the key landmark in the sub-area, for example, location information of a hospital, a parking lot, a shopping mall, or the like, may be determined based on the geographic information data of the sub-area, for example, the map, the point of interest POI, the building type, or the land use type. Optionally, with reference to existing experience, after the key landmark (for example, a gate, a teaching building, or a canteen) is determined from the sub-area, the location information of the key landmark may be determined based on the geographic information data of the sub-area. There is a plurality of key landmarks.

After the location information of the key landmark is determined, the crowd flow rule between the key landmarks may be determined based on the location information of the key landmark and the crowd flow data (for example, MDT data) of the sub-area to establish the crowd flow feature map of the sub-area. The crowd flow feature map is the directed graph including the plurality of nodes and the connection line between the nodes, the node indicates the key landmark, and the connection line indicates the crowd flow direction between the nodes.

The crowd flow feature map may be represented as G'=(V', E', W'), G' indicates the crowd flow feature map, V' indicates a set of a 2-tuple including a key landmark and time, E' indicates whether interaction (namely, crowd flow) exists between two key landmarks and a direction of the interaction, and W' indicates an interaction amount (namely, person-time) between the two key landmarks.

The FFSM may be used to perform frequent subgraph mining on the crowd flow feature map G' to obtain the crowd flow motif in the sub-area. It may be considered that the crowd flow motif is the multi-point crowd motion pattern that appears frequently and stably in the crowd flow feature map, namely, a steady-state high-order motion rule of the crowd. This may reflect a high-order feature of crowd motion to implement an effective use of high-order interactive information between a plurality of places.

It is assumed that there are m crowd flow motifs in the sub-area, an $i^{th}$ crowd flow motif in the sub-area may be represented as $M_i=(V_i, E_i)$, i and m are positive integers, $1 \leq i \leq m$, and $V_i$ indicates a node set of the $i^{th}$ crowd flow motif, namely, a key landmark set of the $i^{th}$ crowd flow motif. It is assumed that there are n nodes (n is a positive integer) in the $i^{th}$ crowd flow motif, $V_i=\{v_1, v_2, \ldots, v_n\}$, $v_1$ indicates a first node, $v_2$ indicates a second node, . . . , $v_n$ indicates an $n^{th}$ node, $E_i$ indicates directed crowd flow between nodes in the $i^{th}$ crowd flow motif, $E_i=(e_{jk})_{n \times n}$, $e_{jk}$ indicates directed crowd flow between a $j^{th}$ node $v_j$ and a $k^{th}$ node $v_k$, j and k are positive integers, $1 \leq j \leq n$, and $1 \leq k \leq n$.

Because each key landmark in the sub-area has a clear geographical meaning and the land use type may be interpreted, each node in the crowd flow motif in the sub-area also has a clear semantic label. In this way, the interpretability of the crowd flow motif can be improved.

Figure 4A:
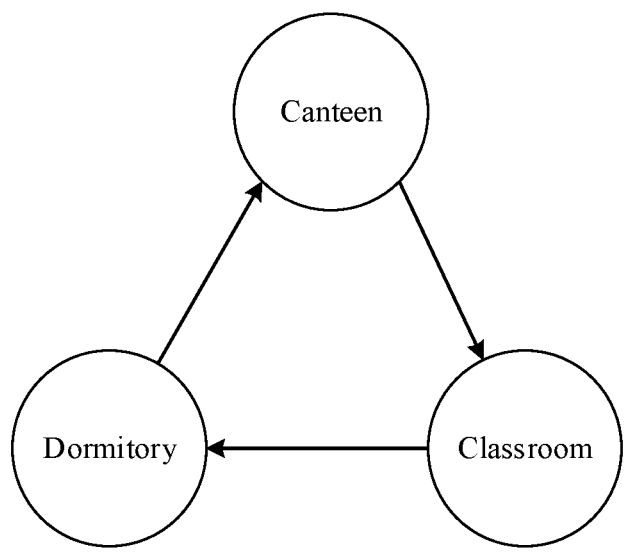
FIG. 4A is a schematic diagram of a crowd flow motif according to an embodiment of this disclosure.

FIG. 4A is a schematic diagram of a crowd flow motif according to an embodiment of this disclosure. It is assumed that the sub-area is a campus, and a daily motion rule of a large quantity of students in the campus is "dormitory→canteen→classroom→dormitory". An extracted crowd flow motif in the sub-area is shown in FIG. 4A.

Figure 4B:
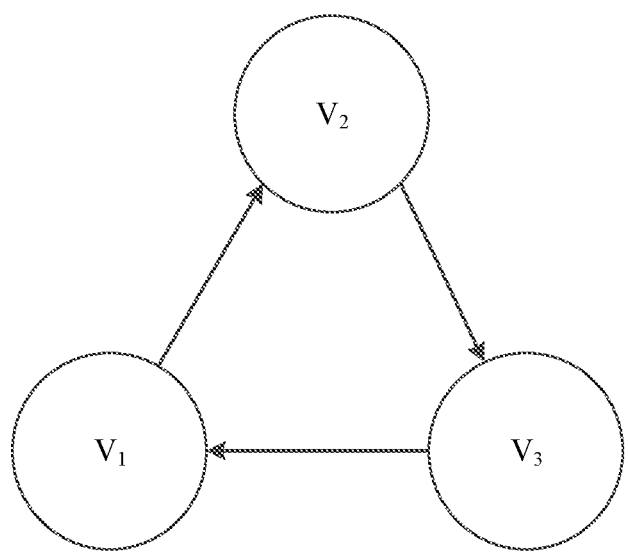
FIG. 4B is a schematic diagram of an abstract representation of a crowd flow motif according to an embodiment of this disclosure.

FIG. 4B is a schematic diagram of an abstract representation of a crowd flow motif according to an embodiment of this disclosure. The abstract representation of the crowd flow motif in FIG. 4A may be performed to obtain a schematic diagram shown in FIG. 4B. As shown in FIG. 4B, the crowd flow motif M=(V, E) is provided, V=($v_1$, $v_2$, $v_3$), $v_1$ indicates a first node, semantics of the first node is dormitory, $v_2$ indicates a second node, semantics of the second node is canteen, $v_3$ indicates a third node, semantics of the third node is classroom, and E indicates directed crowd flow between nodes $v_1$, $v_2$ and $v_3$, and may be represented by a matrix, for example, $$E = \left\{\begin{matrix} 0 & 1 & 0 \\ 0 & 0 & 1 \\ 1 & 0 & 0 \end{matrix}\right\}.$$

The location information of the key landmark in the sub-area is determined, and the crowd flow feature map of the sub-area is determined based on the crowd flow data of the sub-area and the location information of the key landmark to extract the crowd flow motif from the crowd flow feature map. This not only improves accuracy and extraction efficiency of the crowd flow motif, but also enables each node of the crowd flow motif to have spatial semantics to improve the interpretability of the crowd flow motif.

Step S330: Determine a crowd flow feature of the sub-area based on the crowd flow motif.

The crowd flow feature indicates an occurrence frequency of the crowd flow motif in the sub-area.

After the crowd flow motif in the sub-area is determined, the crowd flow feature of the sub-area may be determined based on the occurrence frequency of the crowd flow motif in the sub-area. For example, five types of crowd flow motifs are determined in total in the sub-area, so that the occurrence frequency of each type of crowd flow motif in the sub-area may be separately determined. The occurrence frequency indicates a quantity of persons whose motion patterns in the sub-area are consistent with a corresponding crowd flow motif. It is assumed that occurrence frequencies of the five types of crowd flow motifs are $d_1$, $d_2$, $d_3$, $d_4$, and $d_5$ respectively. A crowd flow feature d of the sub-area may be represented as d=$\{d_1, d_2, d_3, d_4, d_5\}$.

In a possible implementation, u (u is a positive integer) types of crowd flow motifs may be preset, and a crowd flow feature of the sub-area may be represented as a u-dimensional vector. For any sub-area, when the crowd flow feature of the sub-area is determined, the crowd flow motif in the sub-area may be determined based on the u types of crowd flow motifs, and the geographic information data of the sub-area and the crowd flow data of the sub-area. In addition, the occurrence frequency of the crowd flow motif in the sub-area may be separately determined, and then the occurrence frequency is filled in a corresponding position of the u-dimensional vector to obtain the crowd flow feature of the sub-area. For a crowd flow motif that is not extracted in the sub-area, an occurrence frequency of the crowd flow motif may be set to 0.

For example, six types of crowd flow motifs are preset, which are respectively B1, B2, B3, B4, B5, and B6. There are three types of crowd flow motifs determined from a sub-area A, which are respectively B2, B4, and B5. When a crowd flow feature of the sub-area A is determined, occurrence frequencies of crowd flow motifs B2, B4, and B5 in the sub-area A may be separately determined. It is assumed that the occurrence frequencies are respectively 1000, 800, and 1200, the crowd flow feature of the sub-area A may be represented as a 6-dimensional vector (0, 1000, 0, 800, 1200, 0). In the crowd flow feature, occurrence frequencies of crowd flow motifs B1, B3, and B6 that are not extracted from the sub-area A are all set to 0.

It should be noted that a person skilled in the art may set a representation manner of the crowd flow feature based on an actual situation, and may further perform processing such as normalization on the crowd flow feature. This is not limited in this disclosure.

Step S340: Predict data traffic of the sub-area based on the crowd flow feature of the sub-area to obtain a data traffic prediction result of the sub-area.

It is assumed that a subject by which data traffic is generated is a person moving in a geographic area, and crowd flow rules are similar in different geographic areas (for example, different urban areas). Based on this assumption, after the crowd flow feature of the sub-area is determined, the data traffic of the sub-area may be predicted based on the crowd flow feature by comparing a similarity between the crowd flow feature of the sub-area and the crowd flow feature of another geographic area (with historical traffic data), or by using a pre-trained traffic prediction model, or the like, to obtain the data traffic prediction result of the sub-area.

In a possible implementation, the data traffic prediction result may be represented by using a time spectrum curve, a multi-dimensional vector, or the like. This is not limited in this disclosure. When the traffic prediction method is applied to data traffic prediction of a telecommunication network, the data traffic prediction result may include a data traffic prediction result of the telecommunication network.

Step S320, step S330, and step S340 may be repeatedly performed to obtain the data traffic prediction result of each sub-area of the to-be-predicted geographic area, and traffic prediction results of all sub-areas in the geographic area are determined as a data traffic prediction result of the geographic area.

For example, it is assumed that the to-be-predicted geographic area includes four sub-areas, which are respectively a sub-area A1, a sub-area A2, a sub-area A3, and a sub-area A4. Step S320, step S330, and step S340 may be performed to separately determine data traffic prediction results of the sub-area A1, the sub-area A2, the sub-area A3, and the sub-area A4, and then the data traffic prediction results of the sub-area A1, the sub-area A2, the sub-area A3, and the sub-area A4 are determined as a data traffic prediction result of the geographic area.

According to this embodiment of this disclosure, the traffic autonomous zone division may be performed on the to-be-predicted geographic area based on the geographic information data of the geographic area and the crowd flow data of the geographic area to obtain the plurality of sub-areas. For any sub-area, the crowd flow motif in the sub-area is determined based on the geographic information data of the sub-area and the crowd flow data of the sub-area. The crowd flow feature of the sub-area is determined based on the crowd flow motif. The data traffic of the sub-area is further predicted based on the crowd flow feature of the sub-area to obtain the data traffic prediction result of the sub-area. In this way, the data traffic of the sub-area is predicted by constructing the crowd flow motif based on the sub-area and using the crowd flow feature determined by the crowd flow motif. Therefore, a geographic area without historical traffic data can be predicted to enable data traffic prediction to be independent of historical traffic data of the to-be-predicted geographic area, and accuracy of the data traffic prediction can be improved.

Figure 5:
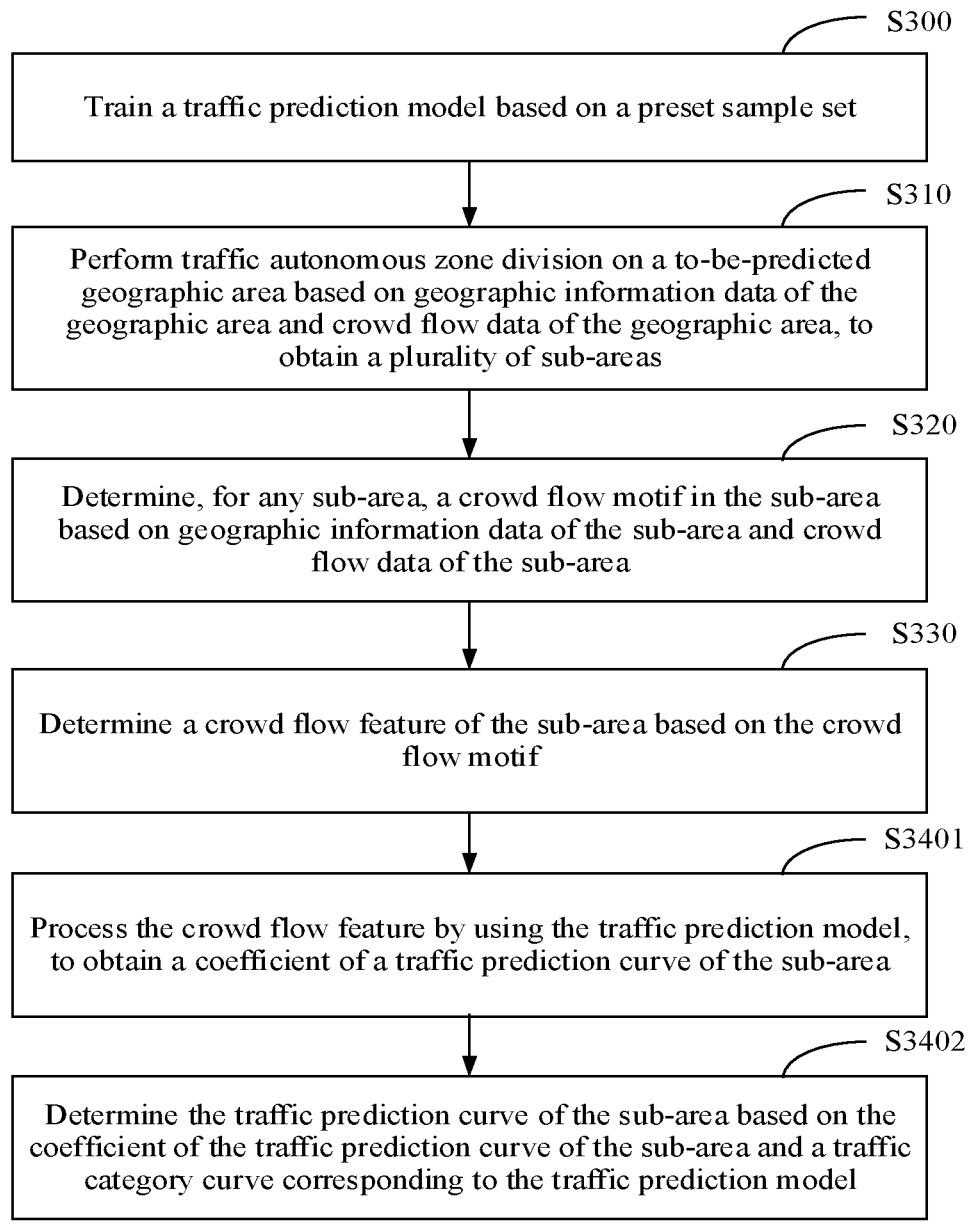
FIG. 5 is a flowchart of a traffic prediction method according to an embodiment of this disclosure.

FIG. 5 is a flowchart of a traffic prediction method according to an embodiment of this disclosure. As shown in FIG. 5, the traffic prediction method in this embodiment predicts data traffic of a sub-area by using a traffic prediction model, and includes step S300, step S310, step S320, step S330, step S3401, and step S3402. Step S3401 and step S3402 are possible more detailed implementations of step S340 in an embodiment shown in FIG. 3.

Step S300: Train a traffic prediction model based on a preset sample set.

The sample set includes geographic information data of a plurality of sample areas, crowd flow data of the plurality of sample areas, and historical traffic data of the plurality of sample areas.

The traffic prediction model is trained by using the preset sample set to obtain a trained traffic prediction model. This can improve accuracy of the traffic prediction model, and improve accuracy of data traffic prediction.

In a possible implementation, step S300 may include determining a crowd flow feature of each sample area based on the geographic information data of each sample area and the crowd flow data of each sample area in the sample set; determining traffic category curves based on the historical traffic data of the plurality of sample areas; determining a first traffic curve of each sample area based on the traffic category curve, where the first traffic curve is a linear combination of the traffic category curves; and using the crowd flow feature of each sample area as an input, and using a coefficient of the first traffic curve of each sample area as an output to train the traffic prediction model.

The sample area in the sample set may be an administrative area such as a province, a city, a district, or a county, or may be a geographic area demarcated by an operator for ease of management, for example, a geographic area divided when the operator deploys a 4G/5G network. This is not limited in this disclosure.

In a possible implementation, for any sample area in the sample set, a theme of the sample area may be determined based on data such as a land use type and location semantics in the geographic information data of the sample area. For example, the theme of the sample area, for example, a school, a residential area, or a hospital, may be generated by using a theme generation model based on the data such as the land use type and the location semantics in the geographic information data of the sample area. Comprehensibility and interpretability of the sample area may be improved by defining the theme for the sample area.

In a possible implementation, the crowd flow feature of each sample area may be determined based on the geographic information data of each sample area and the crowd flow data of each sample area in the sample set. For example, for any sub-area, a crowd flow motif in the sample area may be determined based on the geographic information data of the sample area and the crowd flow data of the sample area. In addition, the crowd flow feature of the sample area is determined based on the crowd flow motif in the sample area. A specific process of determining the crowd flow feature of the sample area is similar to a manner of determining a crowd flow feature of a sub-area in an embodiment shown in FIG. 3. Details are not described herein again.

In a possible implementation, the traffic category curves may be determined based on the historical traffic data of the plurality of sample areas. The historical traffic data may include an engineering parameter, traffic statistics data, a measurement report (MR), and the like. The historical traffic data may be obtained from each base station, or may be obtained from a historical traffic database of the operator. A source of the historical traffic data is not limited in this disclosure.

In a possible implementation, the traffic category curve corresponds to preset duration. For example, when data traffic of next seven days is predicted (that is, when a prediction period is seven days), the preset duration may be set to seven days, and then historical traffic data of each sample area is divided in a unit of seven days. In this way, a traffic category curve corresponding to the preset duration (seven days) is determined based on divided historical traffic data.

In a possible implementation, when the traffic category curve is determined, a second traffic curve of each sample area may be first determined based on the historical traffic data of each sample area.

For example, for any sample area, statistics may be collected on the historical traffic data of the sample area to obtain a statistical result. For example, the preset duration is one day, and a preset sampling interval is ten minutes. The historical traffic data in the sample area may be divided into a plurality of historical traffic data groups based on 24 hours per day. For any historical traffic data group, historical traffic of the sample area at each sampling time point may be collected based on the sampling interval to obtain the statistical result, and then processing such as curve-fitting is performed on the statistical result to obtain the second traffic curve. The second traffic curve is a traffic time spectrum curve. When there is a plurality of historical traffic data groups, there are also a plurality of second traffic curves in the sample area.

It should be noted that values of the preset duration and the sampling interval may be set based on an actual situation such as quality of the historical traffic data and the prediction period, and are not limited to seven days, one day, 24 hours, and ten minutes in the foregoing example. In other words, specific values of the preset duration and the sampling interval are not limited in this disclosure.

After the second traffic curve of each sample area is determined, clustering processing may be performed on the second traffic curves of the plurality of sample areas in the sample set by using a clustering algorithm such as a K-means clustering algorithm (K-Means) and spectral clustering based on graph segmentation to obtain the traffic category curves.

For example, each second traffic curve may be standardized to obtain a standardized second traffic curve. In addition, based on a preset time interval, each standardized second traffic curve is separately represented as a feature vector x whose length is D. It is assumed that any standardized second traffic curve is a traffic time spectrum curve of 24 hours, and a preset time interval is 0.5 hours, D=24÷0.5=48. A feature vector of the second traffic curve is $x=(x_1, x_2, \ldots, x_{48},)$, $x_1$ indicates a first value selected from the standardized second traffic curve, $x_2$ indicates a second value selected from the standardized second traffic curve, ..., and $x_{48}$ indicates a $48^{th}$ value selected from the standardized second traffic curve. A time interval between two adjacent values is 0.5 hours.

In the foregoing manner, a feature vector of each standardized second traffic curve may be determined. The clustering processing may be performed on the feature vector by using the clustering algorithm such as the K-means and the spectral clustering based on the graph segmentation to obtain P clusters and a cluster center of each cluster. P is a positive integer. A quantity P of the cluster may be used as a quantity of traffic category curves. Curves $\{l_1, l_2, \ldots, l_P\}$ corresponding to cluster centers of the P clusters are determined as traffic class curves.

In a possible implementation, for any cluster, based on a theme of a sample area corresponding to a second traffic curve in the cluster, a semantic label, such as a working type, a residential type, or a transportation type, of a traffic category curve corresponding to the cluster may be determined in a manner such as keyword extraction and semantic analysis. In this way, interpretability of the traffic category curve is improved.

The second traffic curve of each sample area is determined based on the historical traffic data of each sample area, and second traffic curves are clustered to obtain the traffic category curves. This is simple, fast, and accurate, thereby improving processing efficiency and accuracy.

After the traffic category curve is determined, the first traffic curve of each sample area may be determined based on the traffic category curve. The first traffic curve is a linear combination of traffic category curves. For example, the second traffic curve in any sample area may be represented as a linear combination of the traffic category curves $\{l_1, l_2, \ldots, l_P\}$ by using a decomposition manner such as Fourier analysis, and the second traffic curve represented in a linear combination manner is determined as the first traffic curve of the sample area.

In a possible implementation, a first traffic curve x' of any sample area may be represented by using the following formula (1):

$$x'=c_1 l_1+c_2 l_2+\ldots+c_P l_P+\epsilon=\Sigma_{q=1}^{P} c_q l_q+\epsilon \qquad (1)$$

In the foregoing formula (1), $c_1, c_2, \ldots,$ and $c_p$ are coefficients of the first traffic curve x', and respectively indicate weights of $l_1, l_2, \ldots, l_p$ in the first traffic curve x'. A residual $\epsilon$ is a white noise sequence, q is a positive integer, and $1 \leq q \leq P$.

After the crowd flow feature of each sample area and the first traffic curve of each sample area are obtained, the crowd flow feature of each sample area may be used as the input, and the coefficient of the first traffic curve of each sample area may be used as the output to train the traffic prediction model.

For example, it is assumed that the traffic prediction model includes P submodels, and each submodel corresponds to one coefficient. It is assumed that a quantity of sample areas is Z, a coefficient of the first traffic curve of a $g^{th}$ sample area is $c_g=\{c_{g1}, c_{g2}, \ldots, c_{gP}\}$, a crowd flow feature of the $g^{th}$ sample area is $d'_g=\{d'_{g1}, d'_{g2}, \ldots, d'_{gu}\}$, Z and g are positive integers, and $1 \leq g \leq Z$.

When the coefficient $c_g$ of the first traffic curve and the crowd flow feature $d'_g$ in the $g^{th}$ sample area are used to train the traffic prediction model, $d'_g=\{d'_{g1}, d'_{g2}, \ldots, d'_{gu}\}$ may be used as an input (namely, an independent variable), and $c_g=\{c_{g1}, c_{g2}, \ldots, c_{gP}\}$ may be used as an output (namely, a response variable) to train the traffic prediction model. This may be represented as the following formula (2):

$$c_{gq}=f_q(d'_{g1},d'_{g2},\ldots,d'_{gu}) \qquad (2)$$

In the foregoing formula (2), $c_{gq}$ indicates a $q^{th}$ coefficient in $c_g$, and $f_q$ indicates a $q^{th}$ submodel of the traffic prediction model.

In other words, the crowd flow feature $d'_g$ in the $g^{th}$ sample area as the input, and the $q^{th}$ coefficient $c_{gq}$ of the first traffic curve in the $g^{th}$ sample area as an output to train the $g^{th}$ submodel of the traffic prediction model.

In a possible implementation, the traffic prediction model may be a machine learning model such as a support vector machine, a random forest, or an extreme gradient boosting (XGBoost). A specific type of the traffic prediction model is not limited in this disclosure.

The following uses an example in which the traffic prediction model is the support vector machine to describe a training process of the traffic prediction model.

The $q^{th}$ submodel $f_q$ of the traffic prediction model may be represented by the following formula (3):

$$f_q(d)=w_q\phi(d)+b_q \qquad (3)$$

In the foregoing formula (3), d is an input variable, and indicates an input crowd flow feature of a sample area, $w_q$ and $b_q$ are to-be-trained parameters of the $q^{th}$ submodel, and $\phi(\cdot)$ is a non-linear mapping function.

When the traffic prediction model is the support vector machine, the $q^{th}$ submodel $f_q$ of the traffic prediction model may be represented by using the following formula (4):

$$\min_{w_q,b_q} \frac{1}{2}\|w_q\|^2 + C\sum_g l_\epsilon(f_q(d'_g) - c_{gq}) \qquad (4)$$

In the foregoing formula (4), C is a regularization constant, $l_\epsilon$ is a loss function, $$l_\varepsilon(y) = \begin{cases} 0, & |y| < \epsilon \\ |y| - \epsilon, & y \geq \epsilon \end{cases}, \text{ and}$$

$$y = f_q(d'_g) - c_{gq}.$$

A crowd flow feature and a coefficient of a first traffic curve in Z sample areas are used to train (for example, $w_q$ and $b_q$ are adjusted) and test the $q^{th}$ submodel $f_q$ of the traffic prediction model described in the formula (4). In this way, a trained $q^{th}$ submodel $f_q$ is obtained. Each submodel of the traffic prediction model may be trained by using a similar method to obtain a trained traffic prediction model.

The crowd flow feature of each sample area in the sample set and the first traffic curve of each sample area in the sample set are determined, the crowd flow feature of each sample area is used as the input, and the coefficient of the first traffic curve of each sample area is used as the output to train the traffic prediction model. In this way, not only accuracy of the traffic prediction model may be improved, and the crowd flow feature is restricted in the sample area, but also interpretability of the traffic prediction model may be improved.

Step S310: Perform traffic autonomous zone division on a to-be-predicted geographic area based on geographic information data of the geographic area and crowd flow data of the geographic area to obtain a plurality of sub-areas.

Step S320: Determine, for any sub-area, a crowd flow motif in the sub-area based on the geographic information data of the sub-area and the crowd flow data of the sub-area.

Step S330: Determine a crowd flow feature of the sub-area based on the crowd flow motif.

Optionally, step S310, step S320, and step S330 are similar to step S310, step S320, and step S330 in an embodiment shown in FIG. 3, and are not repeatedly described herein.

Step S3401: Process the crowd flow feature by using the traffic prediction model to obtain a coefficient of a traffic prediction curve of the sub-area.

The traffic prediction model is the trained traffic prediction model in step S300. The traffic prediction curve is a linear combination of the traffic category curves corresponding to the traffic prediction model. The coefficient of the traffic prediction curve indicates a weight of each traffic category curve in the traffic prediction curve.

For any sub-area, the crowd flow feature of the sub-area may be processed by using the traffic prediction model, for example, a crowd flow feature $d^* = \{d_1, d_2, \ldots, d_u\}$ of the sub-area. The traffic prediction model includes P submodels. Each submodel corresponds to one coefficient, and $d^*$ may be separately input into each submodel of the traffic prediction model for processing to obtain P coefficients of the traffic prediction curve of the sub-area.

In a possible implementation, a $q^{th}$ coefficient $c^*_q$ of the traffic prediction curve of the sub-area may be determined by using the following formula (5):

$$c^*_q = f_q(d^*) \quad (5)$$

Step S3402: Determine the traffic prediction curve of the sub-area based on the coefficient of the traffic prediction curve of the sub-area and the traffic category curve corresponding to the traffic prediction model.

For any sub-area, a coefficient of the traffic prediction curve determined in step S3401 is $\{c^*_1, c^*_2, \ldots, c^*_P\}$, the traffic category curve corresponding to the traffic prediction model is $\{l_1, l_2, \ldots, l_P\}$. The traffic prediction curve of the sub-area may be determined in a linear combination manner. The traffic prediction curve is used as a data traffic prediction result of the sub-area.

A traffic prediction curve $x^*$ of the sub-area may be represented by using the following formula (6):

$$x^* = c^*_1 l_1 + c^*_2 l_2 + \ldots + c^*_P l_m \quad (6)$$

Step S320, step S330, step S3401, and step S3402 may be repeatedly performed to obtain the data traffic prediction result of each sub-area of the to-be-predicted geographic area, and traffic prediction results of all sub-areas in the geographic area are determined as a data traffic prediction result of the geographic area.

In this embodiment, the traffic prediction model may be trained based on the preset sample set to obtain the trained traffic prediction model. The traffic autonomous zone division is performed on the to-be-predicted geographic area based on the geographic information data of the geographic area and the crowd flow data of the geographic area to obtain a plurality of sub-areas. For any sub-area, the crowd flow motif in the sub-area is determined based on the geographic information data of the sub-area and the crowd flow data of the sub-area to further determine the crowd flow feature of the sub-area. The crowd flow feature may be processed by using the trained traffic prediction model to obtain the coefficient of the traffic prediction curve of the sub-area. In addition, the data traffic prediction result (namely, the traffic prediction curve) of the sub-area is determined based on the coefficient of the traffic prediction curve of the sub-area and the traffic category curve corresponding to the traffic prediction model. In this way, the data traffic prediction may be performed by using the traffic prediction model that uses the crowd flow feature as an input to enable the data traffic prediction to be independent of the historical traffic data of the to-be-predicted geographic area. In addition, the data traffic prediction result of the sub-area is determined based on the coefficient of the traffic prediction curve of the sub-area determined by the traffic prediction model and the traffic category curve corresponding to the traffic prediction model to improve accuracy of the data traffic prediction.

Figure 6:
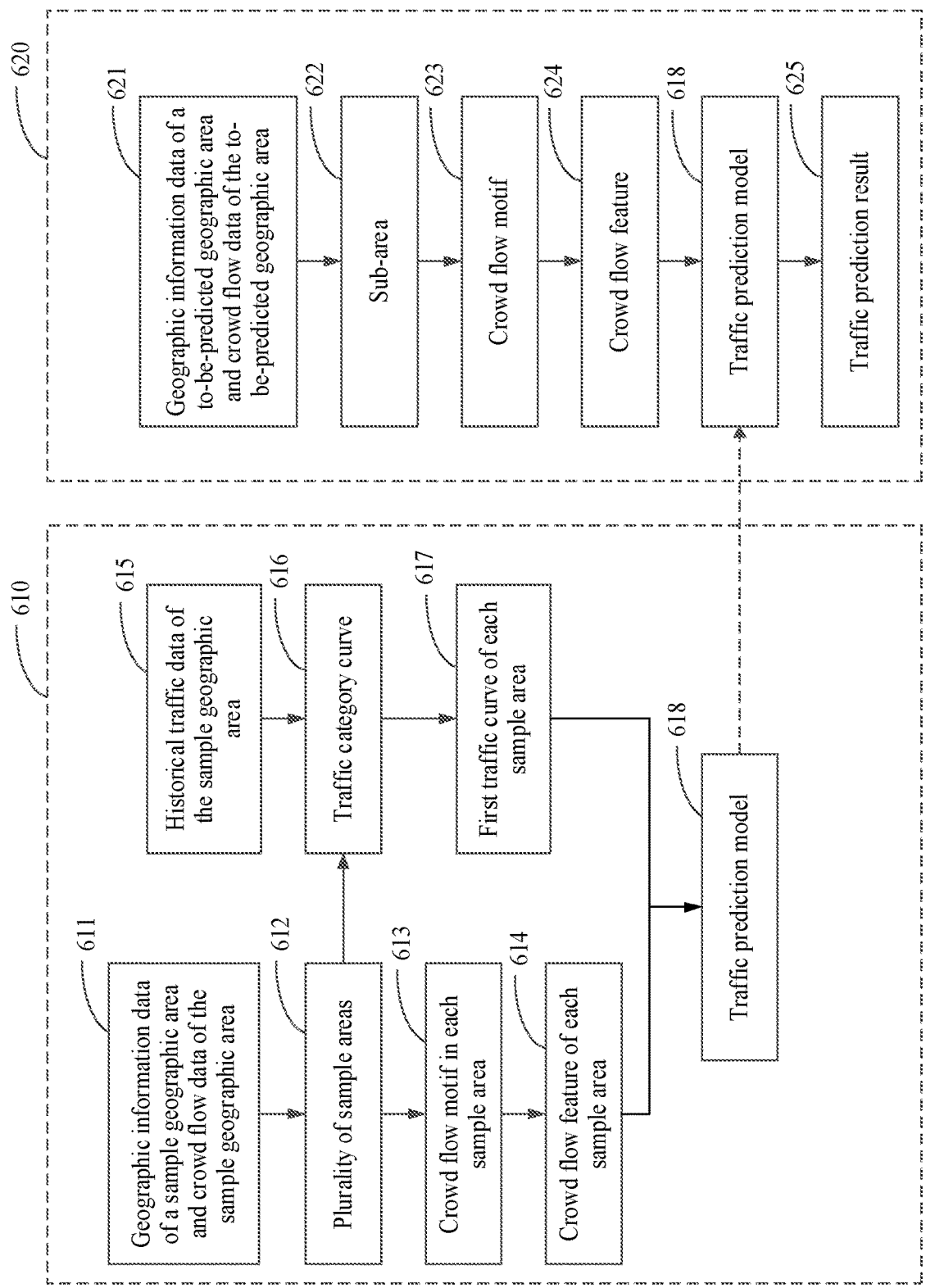
FIG. 6 is a schematic diagram of transferring of a traffic prediction model according to an embodiment of this disclosure.

FIG. 6 is a schematic diagram of transferring of a traffic prediction model according to an embodiment of this disclosure. As shown in FIG. 6, the traffic prediction model includes two phases: a training phase 610 and a transfer phase 620.

In the training phase 610 of the traffic prediction model, a sample set may be first established. A plurality of sample geographic areas with historical traffic data may be selected first. For any sample geographic area, based on geographic information data (such as a road network and a POI) of the sample geographic area and crowd flow data 611 of the sample geographic area, traffic autonomous zone TAZ division may be performed on the sample geographic area by using a network community discovery algorithm to obtain a plurality of sample areas 612. After the traffic autonomous zone division is performed on the plurality of sample geographic areas to obtain a sample area, the sample set may be established based on geographic information data of the plurality of sample areas, crowd flow data (which is determined from geographic information data and crowd flow data of a corresponding sample geographic area) of the plurality of sample areas, and historical traffic data (which is determined from historical traffic data 615 of a corresponding sample geographic area) of the plurality of sample areas.

A crowd flow motif 613 in each sample area in the sample set may be determined by using a frequent subgraph mining algorithm. A crowd flow feature 614 of each sample area is determined based on the crowd flow motif 613 in each sample area.

A second traffic curve of each sample area may be determined based on the historical traffic data of each sample area. Second traffic curves are clustered to obtain traffic category curves 616. In this way, by using a decomposition manner such as Fourier analysis, the second traffic curve of each sample area may be represented as a linear combination of the traffic category curves 616, and the second traffic curve represented in a linear combination manner is determined as a first traffic curve 617 of each sample area.

A traffic prediction model 618 may be trained based on a coefficient of the first traffic curve 617 of each sample area and the crowd flow feature 614 of each sample area. Optionally, the crowd flow feature 614 of each sample area is used as an input, and the coefficient of the first traffic curve 617 of each sample area is used as an output to train the traffic prediction model 618. When the traffic prediction model 618 meets a preset training end condition, training may be ended to obtain a trained traffic prediction model 618.

During the transfer phase 620 of the traffic prediction model, the trained traffic prediction model 618 may be used to perform traffic prediction on a geographic area without historical traffic data.

Based on geographic information data (such as a road network and a POI) of a to-be-predicted geographic area (without historical traffic data) and crowd flow data 621 of the to-be-predicted geographic area (without the historical traffic data), the traffic autonomous zone TAZ division may be performed on the to-be-predicted geographic area by using the network community discovery algorithm to obtain a plurality of sub-areas 622. A crowd flow motif 623 of each sub-area is determined by using the frequent subgraph mining algorithm. A crowd flow feature 624 of each sub-area is determined based on the crowd flow motif 623 of each sub-area.

After the crowd flow feature 624 of each sub-area is obtained, for any sub-area, the crowd flow feature 624 of the sub-area may be processed by using the traffic prediction model 618 trained in the training phase 610 to obtain a coefficient of a traffic prediction curve of the sub-area. The traffic prediction curve of the sub-area is determined based on the coefficient of the traffic prediction curve of the sub-area and the traffic category curve corresponding to the traffic prediction model. Data traffic prediction curves of the plurality of sub-areas 622 in the geographic area are determined as a data traffic prediction result 625 of the geographic area.

In this embodiment, local similarity of different geographic areas may be described by using the sub-area (namely, a traffic autonomous zone) and the crowd flow motif. In this way, the local similarity of the geographic areas may be fully used to implement transferring of the traffic prediction model to enable the traffic prediction model to implement the traffic prediction in the geographic area without the historical traffic data.

In addition, the crowd flow feature determined based on the crowd flow motif does not depend on personal experience and has fewer restrictions. In comparison with an existing traffic prediction method, more local similarity features may be used to improve traffic prediction precision.

According to the traffic prediction method in embodiments of this disclosure, the traffic autonomous zone division may be performed on the to-be-predicted geographic area to obtain the plurality of sub-areas of the to-be-predicted geographic area. For any sub-area, the crowd flow motif in the sub-area may be determined based on the geographic information data of the sub-area and the crowd flow data of the sub-area. In this way, the crowd flow motif may be restricted in the sub-area, and a relationship between the node of the crowd flow motif and a real geospatial place may be established to implement space-time prediction.

According to the traffic prediction method in embodiments of this disclosure, extraction of the crowd flow motif does not depend on the historical traffic data. In this way, the traffic prediction model may be trained in the geographic area with the historical traffic data, and the trained traffic prediction model is transferred to the geographic area without the historical traffic data for the data traffic prediction.

In addition, a crowd flow behavior is irrelevant to an event such as network adjustment, and is not affected by a traffic abnormal value. Therefore, the traffic prediction method in embodiments of this disclosure is applicable to an unstable scenario. The unstable scenario may include a scenario in which traffic increases or decreases sharply due to a major event, the network adjustment (for example, services are migrated in/out in batches, or a device is under maintenance), promotion (for example, Double 11), or the like.

Figure 7:
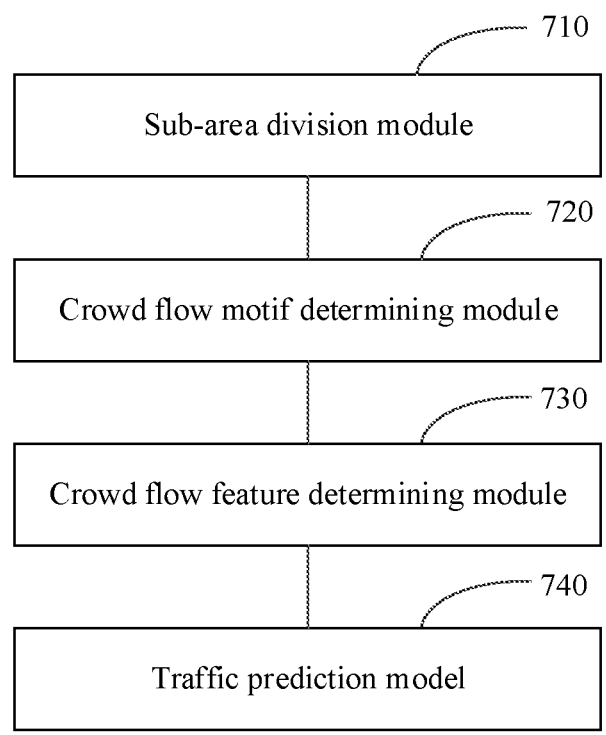
FIG. 7 is a block diagram of a traffic prediction apparatus according to an embodiment of this disclosure.

FIG. 7 is a block diagram of a traffic prediction apparatus according to an embodiment of this disclosure. As shown in FIG. 7, the traffic prediction apparatus includes a sub-area division module 710 configured to perform traffic autonomous zone division on a to-be-predicted geographic area based on geographic information data of the geographic area and crowd flow data of the geographic area to obtain a plurality of sub-areas; a crowd flow motif determining module 720 configured to determine, for any sub-area, a crowd flow motif in the sub-area based on geographic information data of the sub-area and crowd flow data of the sub-area, where the crowd flow motif indicates a multi-point crowd motion pattern in the sub-area; a crowd flow feature determining module 730 configured to determine a crowd flow feature of the sub-area based on the crowd flow motif, where the crowd flow feature indicates an occurrence frequency of the crowd flow motif in the sub-area; and a traffic prediction module 740 configured to predict data traffic of the sub-area based on the crowd flow feature of the sub-area to obtain a data traffic prediction result of the sub-area.

In a possible implementation, the data traffic prediction result includes a traffic prediction curve. The traffic prediction module 740 is configured to process the crowd flow feature by using a pre-trained traffic prediction model to obtain a coefficient of the traffic prediction curve of the sub-area, where the traffic prediction curve is a linear combination of traffic category curves corresponding to the traffic prediction model, and the coefficient of the traffic prediction curve indicates a weight of each traffic category curve in the traffic prediction curve; and determine the traffic prediction curve of the sub-area based on the coefficient of the traffic prediction curve of the sub-area and the traffic category curve corresponding to the traffic prediction model.

In a possible implementation, the crowd flow motif determining module 720 is configured to determine location information of a key landmark in the sub-area based on the geographic information data of the sub-area; determine a crowd flow feature map of the sub-area based on the crowd flow data of the sub-area and the location information of the key landmark, where the crowd flow feature map is a directed graph including a plurality of nodes and a connection line between the nodes, the node indicates the key landmark, and the connection line indicates a crowd flow direction between the nodes; and extract the crowd flow motif in the sub-area from the crowd flow feature map.

In a possible implementation, the apparatus further includes a training module configured to train the traffic prediction model based on a preset sample set. The sample set includes geographic information data of a plurality of sample areas, crowd flow data of the plurality of sample areas, and historical traffic data of the plurality of sample areas.

In a possible implementation, the training module is configured to determine a crowd flow feature of each sample area based on the geographic information data of each sample area and the crowd flow data of each sample area in the sample set; determine traffic category curves based on the historical traffic data of the plurality of sample areas; separately determine a first traffic curve of each sample area based on the traffic category curve, where the first traffic curve is a linear combination of the traffic category curves; and use the crowd flow feature of each sample area as an input, and use a coefficient of the first traffic curve of each sample area as an output to train the traffic prediction model.

In a possible implementation, determining traffic category curves based on the historical traffic data of the plurality of sample areas includes determining a second traffic curve of each sample area based on the historical traffic data of each sample area; and performing clustering on second traffic curves of the plurality of sample areas to obtain the traffic category curves.

In a possible implementation, the geographic information data includes at least one of a map, a road network, a point of interest, an area of interest, a building type, or a social management grid of the geographic area, and the crowd flow data includes at least one of online crowd flow big data, crowd track data in minimization drive test data, or base station handover data related to crowd flow.

In a possible implementation, the apparatus is applied to data traffic prediction of a telecommunication network, and the data traffic prediction result includes a data traffic prediction result of the telecommunication network.

An embodiment of this disclosure provides a traffic prediction apparatus including a processor; and a memory configured to store instructions executable by the processor. When the processor is configured to execute the instructions, the method is implemented.

An embodiment of this disclosure provides a non-volatile computer-readable storage medium, storing computer program instructions. When the computer program instructions are executed by a processor, the method is implemented.

An embodiment of this disclosure provides a computer program product, including computer-readable code or a non-volatile computer-readable storage medium carrying computer-readable code. When the computer-readable code is run in an electronic device, a processor in the electronic device performs the method.

The computer-readable storage medium may be a tangible device that may retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random-access memory (RAM), a read-only memory (ROM), an erasable programmable ROM (EPROM, or flash memory), a static RAM (SRAM), a portable compact disc (CD) ROM, a Digital Versatile Disc (DVD), a memory stick, a floppy disk, a mechanical coding device, for example, a punctured card or a groove protrusion structure that stores instructions, and any suitable combination thereof.

The computer-readable program instructions or code described herein may be downloaded from a computer-readable storage medium to each computing/processing device, or downloaded to an external computer or an external storage device over a network, for example, the Internet, a local area network, a wide area network, and/or a wireless network. The network may include a copper transmission cable, optical fiber transmission, wireless transmission, a router, a firewall, a switch, a gateway computer, and/or an edge server. A network adapter card or a network interface in each computing/processing device receives computer-readable program instructions from a network, and forwards the computer-readable program instructions for storage in a computer-readable storage medium in each computing/processing device.

The computer program instructions used to perform operations in this disclosure may be assembly instructions, instruction set architecture (ISA) instructions, machine instructions, machine-related instructions, microcode, firmware instructions, status setting data, or source code or target code written in one or any combination of more programming languages. The programming languages include object-oriented programming languages such as Smalltalk and C++, and a conventional procedural programming language such as "C" or a similar programming language. The computer-readable program instructions may be executed entirely on a user computer, partly on the user computer, as a stand-alone software package, partly on the user computer and partly on a remote computer, or entirely on the remote computer or a server. When a remote computer is involved, the remote computer may be connected to a user computer over any type of network, including a local area network (LAN) or a wide area network (WAN), or may be connected to an external computer (for example, connected by using an Internet service provider over the Internet). In some embodiments, an electronic circuit, for example, a programmable logic circuit, a field-programmable gate array (FPGA), or a programmable logic array (PLA), is customized by using status information of the computer-readable program instructions. The electronic circuit may execute the computer-readable program instructions to implement various aspects of this disclosure.

The various aspects of this disclosure are described herein with reference to the flowcharts and/or the block diagrams of the method, the apparatus (system), and the computer program product according to embodiments of this disclosure. It should be understood that each block in the flowcharts and/or the block diagrams and combinations of blocks in the flowcharts and/or the block diagrams may be implemented by the computer-readable program instructions.

These computer-readable program instructions may be provided to a processor of a general-purpose computer, a special-purpose computer, or another programmable data processing apparatus to produce a machine such that the instructions, when executed by the processor of the computer or the other programmable data processing apparatus, create an apparatus for implementing functions/actions specified in one or more blocks in the flowcharts and/or the block diagrams. Alternatively, these computer-readable program instructions may be stored in a computer-readable storage medium. These instructions enable a computer, a programmable data processing apparatus, and/or another device to work in a specific manner. Therefore, the computer-readable medium storing the instructions includes an artifact that includes instructions for implementing various aspects of functions/actions specified in one or more blocks in the flowcharts and/or the block diagrams.

Alternatively, these computer-readable program instructions may be loaded onto a computer, another programmable data processing apparatus, or another device, so that a series of operation steps are performed on the computer, the other programmable data processing apparatus, or the other device to produce a computer-implemented process. Therefore, the instructions executed on the computer, the other programmable data processing apparatus, or the other device implements functions/actions specified in one or more blocks in the flowcharts and/or the block diagrams.

The flowcharts and the block diagrams in the appended drawings illustrate system architectures, functions, and operations of possible implementations of apparatuses, systems, methods, and computer program products according to a plurality of embodiments of this disclosure. In this regard, each block in the flowcharts or the block diagrams may indicate a module, a program segment, or a part of the instructions, where the module, the program segment, or the part of the instructions includes one or more executable instructions for implementing a specified logical function. In some alternative implementations, the functions marked in the blocks may also occur in a sequence different from that marked in the accompanying drawings. For example, two consecutive blocks may actually be executed substantially in parallel, and sometimes may be executed in a reverse order, depending on a function involved.

It should also be noted that each block in the block diagrams and/or the flowcharts and a combination of blocks in the block diagrams and/or the flowcharts may be implemented by hardware (for example, a circuit or an application-specific integrated circuit (ASIC)) that performs a corresponding function or action, or may be implemented by a combination of hardware and software, for example, firmware.

Although the present disclosure is described with reference to embodiments, in a process of implementing the present disclosure that claims protection, a person skilled in the art may understand and implement another variation of the disclosed embodiments by viewing the accompanying drawings, the disclosed content, and the accompanying claims. In the claims, "comprising" does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

Embodiments of this disclosure are described above. The foregoing descriptions are examples, are not exhaustive, and are not limited to the disclosed embodiments. Many modifications and changes are clear to a person of ordinary skill in the art without departing from the scope of the described embodiments. The selection of terms used in this specification is intended to best explain the principles of the embodiments, practical application, or improvements to technologies in the market, or to enable another person of ordinary skill in the art to understand the embodiments disclosed in this specification.

What is claimed is:

1. A method comprising:
performing, based on first geographic information data of a geographic area and first crowd flow data of the geographic area, traffic autonomous zone division on the geographic area to obtain a plurality of sub-areas;
determining a crowd flow feature map based on location information of a key landmark in a first sub-area of the sub-areas and second crowd flow data specific to the first sub-area, wherein the crowd flow feature map is a directed graph comprising a plurality of nodes and a connection line between the nodes, wherein the nodes indicate the key landmark, and wherein the connection line indicates a crowd flow direction between the nodes;
extracting, for the first sub-area, a crowd flow motif by performing a fast frequent subgraph mining (FFSM) to the crowd flow feature map;
determining a multi-point crowd motion pattern in the first sub-area based on extracted crowd flow motif, wherein the multi-point crowd motion pattern comprises a motion pattern of the second crowd flow data at multiple key landmarks within the first sub-area, wherein a first crowd flow feature of the first sub-area is based on the multi-point crowd motion pattern, and wherein the first crowd flow feature indicates an occurrence frequency of the crowd flow motif in the first sub-area; and
predicting, based on the first crowd flow feature, data traffic of the first sub-area to obtain a data traffic prediction result of the first sub-area.

2. The method of claim 1, wherein predicting the data traffic comprises processing, using a traffic prediction model, the first crowd flow feature to obtain a first coefficient of a traffic prediction curve of the data traffic prediction result, wherein the traffic prediction curve is a linear combination of traffic category curves corresponding to the traffic prediction model, wherein the first coefficient indicates a weight of each of the traffic category curves in the traffic prediction curve, and wherein the traffic prediction curve is based on the first coefficient and the traffic category curves.

3. The method of claim 2, further comprising training the traffic prediction model based on a preset sample set, and wherein the preset sample set comprises third geographic information data of a plurality of sample areas, third crowd flow data of the plurality of sample areas, and historical traffic data of the plurality of sample areas.

4. The method of claim 3, wherein a second crowd flow feature of each of the sample areas is based on the third geographic information data and the third crowd flow data, wherein the traffic category curves are based on the historical traffic data, wherein a first traffic curve of each of the sample areas is based on the traffic category curves, wherein the first traffic curve is a linear combination of the traffic category curves; and wherein training the traffic prediction model comprises training the traffic prediction model using the second crowd flow feature as an input and using a second coefficient of the first traffic curve of each of the sample areas as an output.

5. The method of claim 4, wherein a second traffic curve of each of the sample areas is based on the historical traffic data, and wherein the method further comprises performing clustering on second traffic curves of the plurality of sample areas to obtain the traffic category curves.

6. The method of claim 1, wherein the first geographic information data comprises at least one of a map, a road network, a point of interest, an area of interest, a building type, or a social management grid of the geographic area, and wherein the first crowd flow data comprises at least one of online crowd flow big data, crowd track data in minimization drive test data, or base station handover data related to crowd flow.

7. The method of claim 1, wherein the data traffic prediction result is of a telecommunication network.

8. A traffic prediction apparatus, comprising:
a memory configured to store instructions; and
one or more processors coupled to the memory and configured to:
perform, based on first geographic information data of a geographic area and first crowd flow data of the geographic area, traffic autonomous zone division on the geographic area to obtain a plurality of sub-areas;
determine a crowd flow feature map based on location information of a key landmark in a first sub-area of the sub-areas and second crowd flow data specific to the first sub-area, wherein the crowd flow feature map is a directed graph comprising a plurality of nodes and a connection line between the nodes, wherein the nodes indicate the key landmark, and wherein the connection line indicates a crowd flow direction between the nodes;
extract, for the first sub-area, a crowd flow motif by performing a fast frequent subgraph mining (FFSM) to the crowd flow feature map;
determine a multi-point crowd motion pattern in the first sub-area based on extracted crowd flow motif, wherein the multi-point crowd motion pattern comprises a motion pattern of the second crowd flow data at multiple key landmarks of interest within the first sub-area, wherein a first crowd flow feature of the first sub-area is based on the multi-point crowd motion pattern, and wherein the first crowd flow feature indicates an occurrence frequency of the crowd flow motif in the first sub-area; and
predict, based on the first crowd flow feature, data traffic of the first sub-area to obtain a data traffic prediction result of the first sub-area.

9. The traffic prediction apparatus of claim 8, wherein the one or more processors are further configured to process, using a traffic prediction model, the first crowd flow feature to obtain a first coefficient of a traffic prediction curve of the data traffic prediction result, wherein the traffic prediction curve is a linear combination of traffic category curves corresponding to the traffic prediction model, wherein the first coefficient indicates a weight of each of the traffic category curves in the traffic prediction curve, and wherein the traffic prediction curve is based on the first coefficient and the traffic category curves.

10. The traffic prediction apparatus of claim 9, wherein the one or more processors are further configured to train the traffic prediction model based on a preset sample set, and wherein the preset sample set comprises third geographic information data of a plurality of sample areas, third crowd flow data of the plurality of sample areas, and historical traffic data of the plurality of sample areas.

11. The traffic prediction apparatus of claim 10, wherein a second crowd flow feature of each of the sample areas is based on the third geographic information data and the third crowd flow data, wherein the traffic category curves are based on the historical traffic data, wherein a first traffic curve of each of the sample areas is based on the traffic category curves, wherein the first traffic curve is a linear combination of the traffic category curves; and wherein the one or more processors are further configured to train the traffic prediction model using the second crowd flow feature as an input and using a second coefficient of the first traffic curve of each of the sample areas as an output.

12. The traffic prediction apparatus of claim 11, wherein a second traffic curve of each of the sample areas is based on the historical traffic data, and wherein the one or more processors are further configured to perform clustering on second traffic curves of the plurality of sample areas to obtain the traffic category curves.

13. The traffic prediction apparatus of claim 8, wherein the first geographic information data comprises at least one of a map, a road network, a point of interest, an area of interest, a building type, or a social management grid of the geographic area, and wherein the first crowd flow data comprises at least one of online crowd flow big data, crowd track data in minimization drive test data, or base station handover data related to crowd flow.

14. The traffic prediction apparatus of claim 8, wherein the data traffic prediction result is of a telecommunication network.

15. A computer program product comprising computer-executable instructions that are stored on a non-transitory computer-readable storage medium and that, when executed by one or more processors, cause a traffic prediction apparatus to:
perform, based on first geographic information data of a geographic area and first crowd flow data of the geographic area, traffic autonomous zone division on the geographic area to obtain a plurality of sub-areas;
determine a crowd flow feature map based on location information of a key landmark in a first sub-area of the sub-areas and second crowd flow data specific to the first sub-area, wherein the crowd flow feature map is a directed graph comprising a plurality of nodes and a connection line between the nodes, wherein the nodes indicate the key landmark, and wherein the connection line indicates a crowd flow direction between the nodes;
extract, for the first sub-area, a crowd flow motif by performing a fast frequent subgraph mining (FFSM) to the crowd flow feature map;
determine a multi-point crowd motion pattern in the first sub-area based on extracted crowd flow motif, wherein the multi-point crowd motion pattern comprises a motion pattern of the second crowd flow data at multiple key landmarks within the first sub-area, wherein a first crowd flow feature of the first sub-area is based on the multi-point crowd motion pattern, and wherein the first crowd flow feature indicates an occurrence frequency of the crowd flow motif in the first sub-area; and
predict, based on the first crowd flow feature, data traffic of the first sub-area to obtain a data traffic prediction result of the first sub-area.

16. The computer program product of claim 15, wherein the instructions that, when executed by the one or more processors, cause the traffic prediction apparatus to process, using a traffic prediction model, the crowd flow feature to obtain a coefficient of a traffic prediction curve of the data traffic prediction result, wherein the traffic prediction curve is a linear combination of traffic category curves corresponding to the traffic prediction model, wherein the coefficient indicates a weight of each of the traffic category curves in the traffic prediction curve, and wherein the traffic prediction curve of the first sub-area is based on the coefficient and the traffic category curves.

17. The computer program product of claim 16, wherein the instructions that, when executed by the one or more processors, cause the traffic prediction apparatus to train the traffic prediction model based on a preset sample set, and wherein the preset sample set comprises third geographic information data of a plurality of sample areas, third crowd flow data of the plurality of sample areas, and historical traffic data of the plurality of sample areas.

18. The computer program product of claim 17, wherein a second crowd flow feature of each of the sample areas is based on the third geographic information data and the third crowd flow data, wherein the traffic category curves are based on the historical traffic data, wherein a first traffic curve of each of the sample areas is based on the traffic category curves, wherein the first traffic curve is a linear combination of the traffic category curves; and wherein the instructions that, when executed by the one or more processors, cause the traffic prediction apparatus to train the traffic prediction model using the second crowd flow feature as an input and using a second coefficient of the first traffic curve of each of the sample areas as an output.

19. The computer program product of claim 18, wherein a second traffic curve of each of the sample areas is based on the historical traffic data, and wherein the instructions that, when executed by the one or more processors, cause the traffic prediction apparatus to perform clustering on second traffic curves of the plurality of sample areas to obtain the traffic category curves.

20. The computer program product of claim 15, wherein the first geographic information data comprises at least one of a map, a road network, a point of interest, an area of interest, a building type, or a social management grid of the geographic area, and wherein the first crowd flow data comprises at least one of online crowd flow big data, crowd track data in minimization drive test data, or base station handover data related to crowd flow.

\* \* \* \* \*